US012688368B2

(12) United States Patent
Hamer et al.

(10) Patent No.: US 12,688,368 B2
(45) Date of Patent: Jul. 21, 2026

(54) TAGGING FOR SUBJECT MATTER OR LEARNING SCHEMA

(71) Applicant: PROMETRIC LLC, Nottingham, MD (US)

(72) Inventors: Jesse Andrew Lewis Hamer, Iowa City, IA (US); Tiago Lima Almeida, Garopaba (BR); Charles Foster, Oakland, CA (US); Nicholas Koprowicz, Denver, CO (US); Lucas Cezimbra, Garopaba (BR); Claudio Souza, Garopaba (BR); Saad Masood Khan, Yardley, PA (US); Sara Vispoel, Iowa City, IA (US)

(73) Assignee: Prometric LLC, Nottingham, DE (US)

( * ) Notice: Subject to any disclaimer, the term of this patent is extended or adjusted under 35 U.S.C. 154(b) by 190 days.

(21) Appl. No.: 18/341,207

(22) Filed: Jun. 26, 2023

(65) Prior Publication Data

US 2023/0419044 A1 Dec. 28, 2023

Related U.S. Application Data

(60) Provisional application No. 63/501,104, filed on May 9, 2023, provisional application No. 63/367,113, filed on Jun. 27, 2022.

(51) Int. Cl.
G06F 40/30 (2020.01)
(52) U.S. Cl.
CPC ................................... G06F 40/30 (2020.01)
(58) Field of Classification Search
None
See application file for complete search history.

(56) References Cited

U.S. PATENT DOCUMENTS

| | | | |
|---|---|---|---|
| 8,517,738 B2 | 8/2013 | Sheehan et al. | |
| 8,838,659 B2 | 9/2014 | Tunstall-Pedoe | |
| 9,082,309 B1 | 7/2015 | Fuka | |
| 9,098,492 B2 | 8/2015 | Tunstall-Pedoe | |
| 9,858,828 B1 | 1/2018 | Fuka | |
| 10,249,207 B2 | 4/2019 | Solomon et al. | |
| 10,504,268 B1 | 12/2019 | Huang et al. | |
| 10,504,376 B2 | 12/2019 | Nibe et al. | |
| 10,664,862 B1 | 5/2020 | Szulczewski et al. | |
| 2003/0216913 A1 | 11/2003 | Keely et al. | |
| 2015/0324459 A1 | 11/2015 | Chhichhia et al. | |
| 2016/0092787 A1* | 3/2016 | Gadde ...................... | G06N 5/02 706/12 |

(Continued)

OTHER PUBLICATIONS

International Search Report and Written Opinion dated Nov. 21, 2023 in connection with International Patent Application No. PCT/US2023/031447, 9 pages.

(Continued)

*Primary Examiner* — Quynh H Nguyen
(74) *Attorney, Agent, or Firm* — Dorsey & Whitney LLP

(57) ABSTRACT

An example method of classifying user content based on a set of standards is described herein. The method includes receiving the user content, generating numeric representations of the user content, and identifying one or more standards of the set of standards applying to the user content based on a comparison of the numeric representation of the user content and numeric representations of the one or more standards.

20 Claims, 8 Drawing Sheets

(56) References Cited

U.S. PATENT DOCUMENTS

| | | | |
|---|---|---|---|
| 2016/0162456 A1 | 6/2016 | Munro et al. | |
| 2017/0169829 A1 | 6/2017 | Celikyilmaz et al. | |
| 2017/0177660 A1 | 6/2017 | Chang et al. | |
| 2017/0371861 A1 | 12/2017 | Barborak et al. | |
| 2018/0101598 A1 | 4/2018 | Allen et al. | |
| 2018/0336183 A1 | 11/2018 | Lee et al. | |
| 2019/0272325 A1 | 9/2019 | Korn | |
| 2019/0378429 A1 | 12/2019 | Panuganty et al. | |
| 2020/0193317 A1 | 6/2020 | Cha et al. | |
| 2020/0218988 A1 | 7/2020 | Boxwell et al. | |
| 2020/0334331 A1 | 10/2020 | Cason et al. | |
| 2020/0342054 A1 | 10/2020 | Cason et al. | |
| 2020/0356729 A1 | 11/2020 | Duan et al. | |
| 2020/0372106 A1 | 11/2020 | Liu et al. | |
| 2020/0387572 A1 | 12/2020 | Allen et al. | |
| 2020/0410050 A1 | 12/2020 | Cason et al. | |
| 2021/0110895 A1 | 4/2021 | Shriberg et al. | |
| 2021/0149994 A1 | 5/2021 | Kim et al. | |
| 2021/0295822 A1 | 9/2021 | Tomkins et al. | |
| 2021/0366303 A1 | 11/2021 | Chadwick et al. | |
| 2021/0383711 A1 | 12/2021 | Panuganty et al. | |
| 2022/0100676 A1 | 3/2022 | Yan et al. | |
| 2022/0108195 A1 | 4/2022 | Kehler | |
| 2022/0121824 A1 | 4/2022 | Hu et al. | |
| 2022/0188661 A1 | 6/2022 | Tappin | |
| 2022/0309356 A1 | 9/2022 | Singh | |
| 2022/0415203 A1 | 12/2022 | Khan et al. | |
| 2023/0122202 A1* | 4/2023 | Dolan | A63F 13/65 |
| | | | 463/35 |
| 2023/0142718 A1* | 5/2023 | Asgekar | G06F 16/90335 |
| | | | 705/326 |

OTHER PUBLICATIONS

International Search Report and Written Opinion for International Patent Application No. PCT/US2022/073192, mailed Dec. 2, 2022.
Khan, Saad M. et al. "Catalog: An Educational Content Tagging System," 14th Intl Conf on Educational Data Mining, EDM 2021, 4 pages.

* cited by examiner

400

Receive user content    402

Generate numeric representations of the user content    404

Identify one or more standards applying to the user content based on a comparison of the numeric representation of the user content and numeric representations of the one or more standards    406

500

Receive user content and one or more standards — 502

Provide a piece of user content and a standard to a generative model — 504

Determine if the standard applies to the piece of user content based on output from the generative model — 506

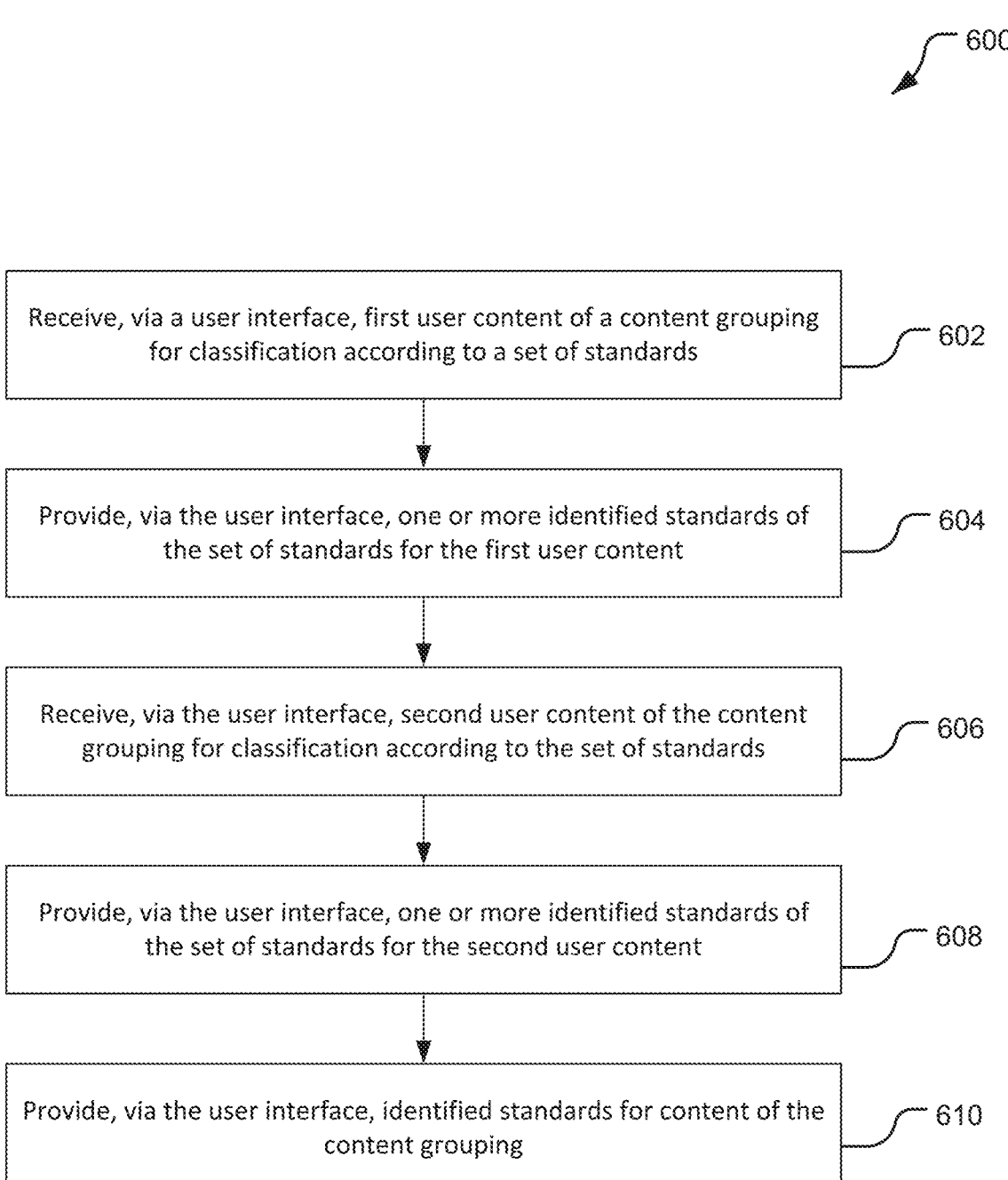

600

Receive, via a user interface, first user content of a content grouping for classification according to a set of standards — 602

Provide, via the user interface, one or more identified standards of the set of standards for the first user content — 604

Receive, via the user interface, second user content of the content grouping for classification according to the set of standards — 606

Provide, via the user interface, one or more identified standards of the set of standards for the second user content — 608

Provide, via the user interface, identified standards for content of the content grouping — 610

FIG. 8

TAGGING FOR SUBJECT MATTER OR LEARNING SCHEMA

CROSS-REFERENCE TO RELATED APPLICATIONS

This application is related to U.S. Provisional Application No. 63/367,113, filed on Jun. 27, 2022, and titled "TAGGING FOR SUBJECT MATTER LEARNING SCHEMA" and U.S. Provisional Application No. 63/501,104, filed on May 9, 2023, and titled "TAGGING FOR SUBJECT MATTER LEARNING SCHEMA," the disclosures of which are incorporated by reference herein in their entirety.

BACKGROUND

Educational content is often tagged to specific schema, classifications, standards, and the like. Such tagging may be based on a conclusion that the subject matter of the educational content falls within or has a specified relationship to a subject matter category defined or described in a particular schema, classification, or standard. For example, when evaluating textbooks or other learning materials for use in specific jurisdictions (e.g., states), the contents are often evaluated against learning standards for the jurisdiction to ensure the materials cover the standards of the jurisdiction. Similarly, standardized tests or other types of educational evaluations may be evaluated against learning standards to assess the coverage of topics in standards. Such evaluation may generally use subject matter experts or other manual approaches and may thus be time consuming and prone to differences in individual judgment.

SUMMARY

An example method of classifying user content based on a set of standards is described herein. The method includes receiving the user content, generating numeric representations of the user content, and identifying one or more standards of the set of standards applying to the user content based on a comparison of the numeric representation of the user content and numeric representations of the one or more standards.

Another example method for classifying user content based on a set of standards is described herein. The method includes receiving a piece of the user content and a standard of the set of standards and providing the piece of the user content and the standard to a generative model. The method further includes determining if the standard applies to the piece of the user content based on output from the generative model.

Another method for classifying user content based on a set of standards is described herein. The method includes receiving a piece of user content and a standard of the set of standards. The method further includes providing the piece of the user content and the standard to a generative model and determining if the standard applies to the piece of the user content based on output from the generative model.

Additional embodiments and features are set forth in part in the description that follows, and will become apparent to those skilled in the art upon examination of the specification and may be learned by the practice of the disclosed subject matter. A further understanding of the nature and advantages of the present disclosure may be realized by reference to the remaining portions of the specification and the drawings, which form a part of this disclosure. One of skill in the art will understand that each of the various aspects and features of the disclosure may advantageously be used separately in some instances, or in combination with other aspects and features of the disclosure in other instances.

BRIEF DESCRIPTION OF THE DRAWINGS

The description will be more fully understood with reference to the following figures in which components are not drawn to scale, which are presented as various examples of the present disclosure and should not be construed as a complete recitation of the scope of the disclosure, characterized in that:

FIG. 8 illustrates an example method for classifying user content into one or more standards and presenting such standards via a user interface.

DETAILED DESCRIPTION

Introduction

Figure 1:
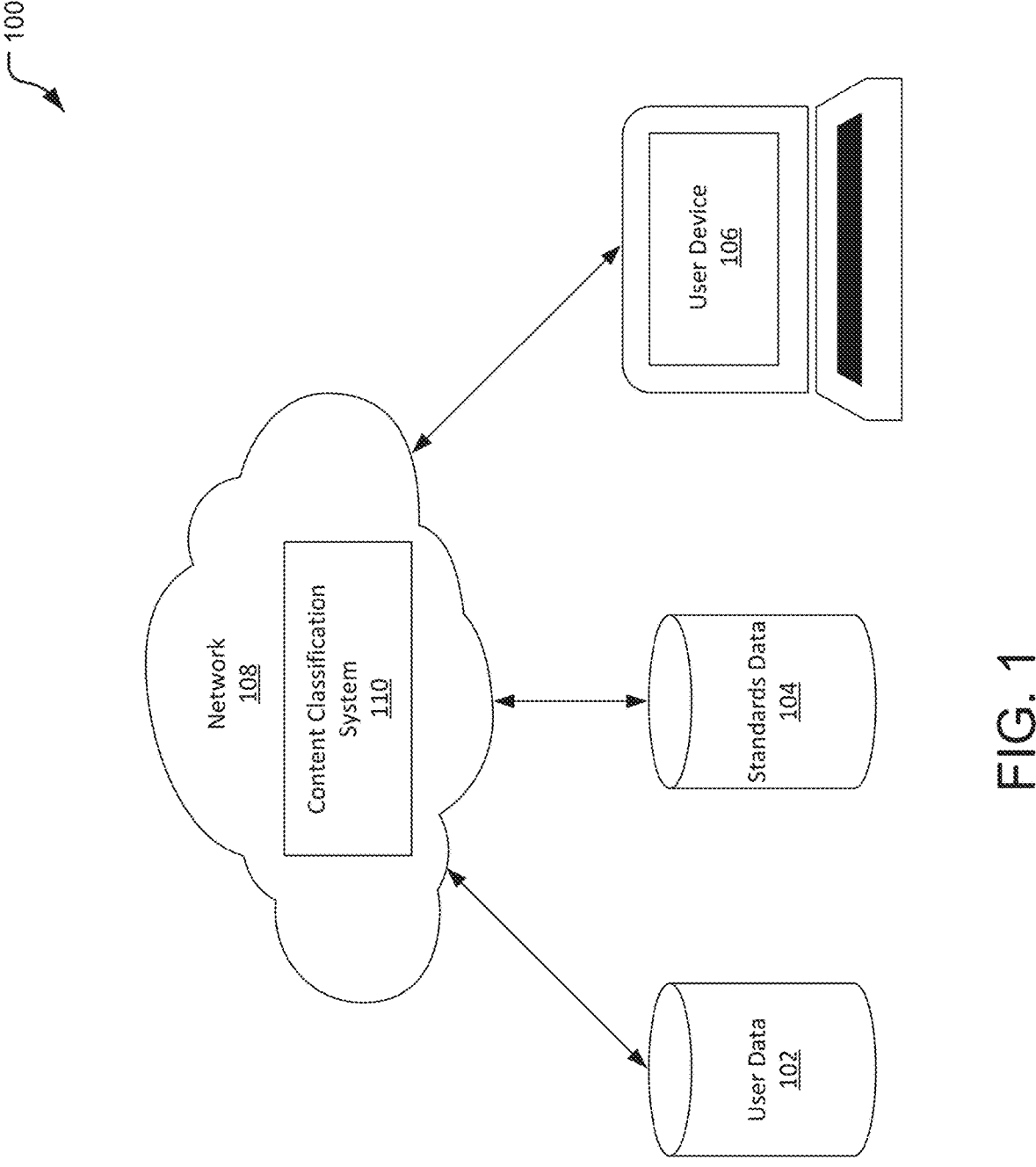
FIG. 1 illustrates an example system including a content classification system configured to classify user content into one or more standards based on taxonomy data in accordance with some embodiments of the disclosure.

Educational standards are often used by various jurisdictions (e.g., school districts, states, and the like) to define what subject matter various courses should teach or exclude and to evaluate what students have learned at various points (e.g., through standardized testing). Often, textbooks and other learning materials are written to cover general subject matter and are evaluated by individual states and/or districts before being adopted for use in the state or district. Part of the evaluation process is often determining whether the textbook or other learning material covers various topics laid out in educational standards. Educational assessment items, such as questions for standardized tests, may be similarly evaluated to determine correspondence with educational standards. Such evaluation may assist in creating tests and other evaluations which test all concepts included in relevant educational standards. In addition to ensuring textbooks and educational assessments address or exclude certain content, associating content with standards may be helpful in tracking skill gaps, recommending remediative learning content to master various topics, and the like. For example, online learning systems may recommend additional instructional content to students who are, by assessment, struggling with concepts outlined in certain standards. In these cases, classification (e.g., association with a standard) of both the assessment items and instructional content enable such recommendations.

Educational standards are generally hierarchical in format, with topics expressed in natural language descriptions at nodes of the hierarchy. Educational standards may utilize a taxonomic knowledge representation to capture knowledge structure, where knowledge structure may include core disciplinary knowledge, skills, and/or cross cutting capabilities expected by use of such standards. Evaluation of educational content (e.g., textbooks, standalone texts, worksheets, test questions, and the like) with respect to standards generally includes identifying one or more standards that are covered by or used to evaluate the educational content. For example, a chapter of a textbook which covers an educational standard may generally teach concepts and material included in the standard. Similarly, test questions which cover an educational standard may test a student's knowledge of concepts and/or material included in the standard.

An example of a standard or set of standards is the Next Generation Science Standards (NGSS). The NGSS were developed by a group of states to improve and standardize science education. The standards include a hierarchical outline of topics covering scientific practices, disciplinary core ideas and crosscutting concepts. Among other objectives, the NGSS can be used to assess and/or measure whether a particular text or portion of a text, workbook, or other set of learning materials (e.g., content), address and/or cover adequately the subject matter within a broad range of foundational science topics. With regard to assessing learning progress, the NGSS can also provide a foundation for measuring whether a set of problems or multiple choice questions (e.g., assessment content) address and/or cover adequately the subject matter they purport to address or cover.

Evaluation of educational content has conventionally been carried out by human subject matter experts specially trained in various subject areas for which at least one set of hierarchical content standards (e.g., a taxonomy) has been formulated. For example, a subject matter expert may be presented with raw, untagged content and manually review and classify such content with respect to one or more sets of educational standards. Such manual classification may be cost and time intensive due to the use of subject matter experts. For example, experts use time to read to-be-reviewed content and may use additional time to review one or more content standards that may be new to the experts. Further, the use of human experts may introduce differences due to variations in personal judgment or skill in evaluation, which may result in less comprehensive testing, use of learning materials that may not adequately cover all standards, and the like. Human experts may use technology such as Microsoft Word or other conventional word processing programs to store and fetch text files containing content to be classified and applicable classification standards, but such technology has few features to aid a subject matter expert in performing accurate and repeatable analysis or in standardizing the performance or reporting of content classification analysis of multiple content files to be classified against multiple standards.

In various situations, content tagged (e.g., classified according to the topical hierarchy of a standard) with respect to one set of standards may be tagged and/or classified with respect to another set of standards based on the first classification. For example, taxonomy crosswalks may be used to translate one set of standards to another set of standards. A taxonomy crosswalk may be a mapping from one set of standards to another set of standards. Due to subtle differences in various standards, such mappings may be imperfect and may propagate and introduce errors in classification the more times tags or classifications are translated between standards. Further, as crosswalks are generally also created by human subject matter experts, errors and/or differences in classifications may be introduced based on which crosswalk is used. For example, different entities (e.g., states, school districts, educators, and the like) may utilize two different crosswalks to translate a first set of standards to a second set of standards. Use of the different crosswalks may result in the same content with the same initial set of tags being classified differently with respect to the second set of standards. Accordingly, use of a textbook or coverage of an educational assessment may be dependent on the specific taxonomy crosswalks used to categorize the content. Due to the hierarchical nature of educational standards, such crosswalks may further not be a one-to-one mapping of the tags of one set of standards to another. For example, abstraction levels and hierarchical structures of standards may result in many-to-many mappings between two sets of standards. In such instances, a subject matter expert may still be utilized to determine which standards of the many-to-many mapping actually apply to specific content.

An objective of the present disclosure is to use artificial intelligence and/or machine learning technologies to make standards more widely and more consistently usable to guide education, assessment, and measurement of learning and associated activities that should follow subject matter schema and/or hierarchical outlines of the topics that various standards currently embody. The disclosure further provides tools that enable educators, subject matter experts, and other parties to move forward in rigorous and measurable ways to apply standards that may continue to evolve with the evolution of knowledge, particularly in the sciences and other evolving subject matter areas. The tools (e.g., the content classification system) described herein are described in "Catalog: An Educational Content Tagging System," by Khan et. al, published in the Proceedings of the 14$^{th}$ International Conference on Educational Data Mining, which is incorporated herein by reference for all purposes.

The content classification system described herein may utilize machine learning and/or artificial intelligence (ML/AI) models to classify content expressed in natural language (including mathematical or other symbolic language for some content) according to various standards. The content classification system may further classify images, videos, sound recordings, and other forms of content. Such classification may be based on a comparison between numerical representations of the content and numerical representations of the standards (e.g., descriptions of various standards expressed in natural language and included in a set of standards). Such numerical representations may be generated by models configured to process the text of the content, saving time and cost resources used in manual tagging of such content. Further, the process of classification using the content classification may remove interdependencies introduced by the use of taxonomy crosswalks, meaning content may be more closely and accurately matched to various sets of educational standards. Classifications produced by the content classification system may further be consistent when the same content is provided to the system, removing inconsistencies that are often introduced by manual classification. Accordingly, the content classification system may be used to provide students with educational content which more closely matches established standards, increasing the likelihood that students are presented with content associated with all applicable educational standards and are evaluated based on all applicable educational standards. With increasing demand for frequent updating of learning content and for evaluating and/or shaping such content to meet a wide variety of standards applicable to a wide range of subject matters, improvements in tools available to perform classification are increasingly useful. Such tools can be valuable to both content creators and institutions seeking to rapidly, accurately, and reliably evaluate already-created or proposed content (e.g., for learning or assessment of learning) against desired standards.

The systems described herein may utilize natural language models and/or transformer tools (e.g., the OpenAI GPT-3), to perform and improve computational linguistic analyses. Such analysis may improve the consistency, accuracy, quantification, and presentation of analytical results. For example, the systems and methods may include performing analyses, such as comparative analyses between a unit of content and all or a portion of a standard, with speed and accuracy that may be impossible for human subject matter experts performing such analyses. The present disclosure describes improvements in technologies used in assessing the sematic significance of content relative to standards that provide an organized and hierarchical taxonomy mapping broader or narrower subject matter areas.

Systems described herein may be utilized to analyze various types of content, including learning content, assessment content, and taxonomic content. Generally, learning content may be material that students engage with in order to improve their understanding of some subject matter. Learning content may include, for example, textbooks, slideshow presentations, online course modules, and video and/or audio recordings of lectures. Assessment content may generally be material that students engage with in order to measure their understanding of some subject matter. For example, multiple choice questions (e.g., selected response items) and free response questions (e.g., constructed response items) are examples of assessment content. Taxonomic content is generally meta content used to organize learning and assessment content according to its purpose and/or subject matter. Some examples of taxonomic content include standards, learning objectives or outcomes, and subject matter topics.

The systems and methods described herein generally produce semantic match scores between two units of content. While many examples discuss using semantic match scores between learning content and taxonomic content or assessment content and taxonomic content in order to categorize or tag such content according to educational standards, other semantic match scores and relationships between types of content may be produced using the systems and methods described herein. The process of producing semantic match scores may be referred to as tagging. For example, learning content may be tagged against other learning content to create a map of references between units of content from either group. Learning content may be tagged against other learning content in a single group of learning content. For example, given a paragraph of a textbook, such tagging may reveal where else in the textbook the subject matter is discussed. In some examples, learning content may be tagged against assessment content to suggest assessment items that may test understanding of a piece of learning content. For example, such tagging may be useful to select assessment items from an item bank to assess understanding of a chapter of a textbook.

In various examples, assessment content may be tagged against learning content. Such tagging may be used to locate learning content related to a selected assessment item. For example, such comparisons can be used to hyperlink end-of-chapter exercises to relevant paragraphs in an e-book. Assessment content may further be tagged against other assessment content in order to locate other assessment items similar to a given assessment item. Such tagging may be used to, for example, find more practice problems for students struggling with a particular problem or type of problem. Assessment content may further be tagged against taxonomic content to determine a degree to which a given taxonomy is covered by an assessment item or set of assessment items.

Taxonomic content may, in various examples, be tagged against learning content. For example, given a unit of taxonomic content (e.g., a standard from a taxonomic set of standards), such tagging may locate representative units of learning content to determine the degree to which the topics and/or objectives of the taxonomic content or its sub-components are covered in some learning content. Taxonomic content may further be tagged against assessment content to, for example, determine taxonomic coverage of assessment items. For example, given a unit of taxonomic content, such tagging may be used to locate representative items to determine the degree to which objectives of the taxonomic content or its sub-components are covered in an item bank of assessment items. Taxonomic content may be tagged against other taxonomic content to evaluate taxonomic alignment. That is, tagging taxonomic content against other taxonomic content may create a mapping between units of one taxonomy and another.

Though the content classification system disclosed herein is described primarily with respect to educational content, the system may be used, in various examples, for classification and/or tagging of other types of content. For example, the content classification system may be used to apply subject matter tags to news articles, website content, academic articles, case studies, and the like.

Content Classification System Overview

A content classification system as disclosed herein may receive user content, such as knowledge assessment items and/or instructional content and may classify such content according to educational standards. Generally, the content classification system may generate numerical representations (e.g., high dimensional feature vectors) of the user content and compare such numerical representations to numerical representations of standards of a set of educational standards. The content classification system may then return the standards which most closely match the user content, which are standards that likely apply to the user content. Accordingly, the content classification system described herein may save resources when compared to use of subject matter experts for categorization of educational content by educational standards. For example, the content classification may be able to categorize user content significantly more quickly than subject matter experts. Further, the content classification system may remove the use of taxonomic crosswalks by categorizing directly to a set of standards, instead of using crosswalks to translate between sets of standards. As taxonomic crosswalks are often an imperfect translation of differing sets of educational standards, removing the taxonomic crosswalks and categorizing directly to a set of standards may result in more accurate categorization when compared to translating between sets of standards.

Turning now to the figures, FIG. 1 illustrates an example system 100 including a content classification system 110 providing for classification of user content items accessible over a network 108 in accordance with some embodiments of the disclosure. As shown in FIG. 1, the system may include a content classification system 110 accessible by a user device 106 via a network 108. The content classification system 110 may also access data, such as user data 102 and/or standards data 104 via the network 108.

Generally, the user device 106 may be a device belonging to an end user, such as a test creator, educational institution, or other entities or users accessing the system 100 to categorize and/or tag user content items. In some implementations, many user devices 106 may be provided with access to the content classification system 110 to classify and/or tag certain content to one or more standards that map an area of knowledge. Where multiple user devices 106 access the content classification system 110, the user devices 106 may be provided with varying permissions, settings, and the like, and may be authenticated by an authentication service prior to accessing the content classification system 110.

The content classification system 110 may receive data, instructions, and other communications from the user device 106 (and other user devices). For example, the classification system 110 may obtain user content, sets of standards, settings, and other similar data from the user device 106, which may be utilized to classify user content according to educational standards. The content classification system 110 may further provide data and other communications to the user device 106. For example, the content classification system 110 may provide one or more identified standards for user content to the user device 106.

In various implementations, the user device 106 and/or additional user devices may be implemented using any number of computing devices including, but not limited to, a computer, a laptop, tablet, mobile phone, smart phone, wearable device (e.g., AR/VR headset, smart watch, smart glasses, or the like), smart speaker, vehicle (e.g., automobile), or appliance. Generally, the user device 106 may include one or more processors, such as a central processing unit (CPU) and/or graphics processing unit (GPU). The user devices may generally perform operations by executing executable instructions (e.g., software) using the processor(s).

The network 108 may be implemented using one or more of various systems and protocols for communications between computing devices. In various embodiments, the network 108 or various portions of the network 108 may be implemented using the Internet, a local area network (LAN), a wide area network (WAN), and/or other networks. In addition to traditional data networking protocols, in some embodiments, data may be communicated according to protocols and/or standards including near field communication (NFC), Bluetooth, cellular connections, and the like. Various components of the system 100 may communicate using different network protocols or communications protocols based on location. For example, the content classification system 110 may be hosted within a cloud computing environment and may communicate with each other using communication and/or network protocols used by the cloud computing environment.

Examples described herein may include storage devices, such as one or more databases, storing data such as user data 102 and/or standards data 104. Such storage devices may be databases, servers, or other repositories of data accessible via the Internet or other network 108. User data 102 and/or standards data 104 may be stored across more than one physical device and may, in some implementations, include storage components and devices belonging to multiple entities, users, or third parties.

User data 102 may include, for example, user content, tags associated with user content, applicable standards, groupings of user content (e.g., collections of content), user settings, and the like. For examples, tags associated with user content may include tags from other taxonomies, which may be useful in classifying or tagging the content in a given taxonomy. In various examples, user content may include various types of educational content, including instructional content and assessment content (e.g., knowledge assessment items) and/or metadata associated with various user content. Instructional content may include, for example, textbooks, excerpts from textbooks (e.g., chapters or sections), articles, reading passages, instructional slideshows, transcripts from video content, and the like. Assessment content may include, in various examples, multiple choice questions, writing prompts, short answer questions, materials provided with questions (e.g., reading passages, diagrams), model answers to test questions, and the like. Metadata included with user content may include, for example, key and distractor labels, item cognitive type (e.g., recall, application, etc.), and difficulty metrics (e.g., p-value and point biserial) for assessment content.

Standards data 104 may include, for example, the natural language text of various standards, taxonomic structure of a set of standards (e.g., hierarchical relationships between different standards of the set of standards), numbering schemes, and/or other data about sets of standards.

Components of the system 100 shown in FIG. 1 are exemplary and may vary in some embodiments. For example, in some embodiments, the content classification system 110 may be distributed across multiple computing elements, such that components of the content classification system 110 communicate with one another through the network 108. Further, in some embodiments, computing resources dedicated to the content classification system 110 may vary over time based on various factors such as usage of the content classification system 110.

Content Classification System Components

Figure 2:
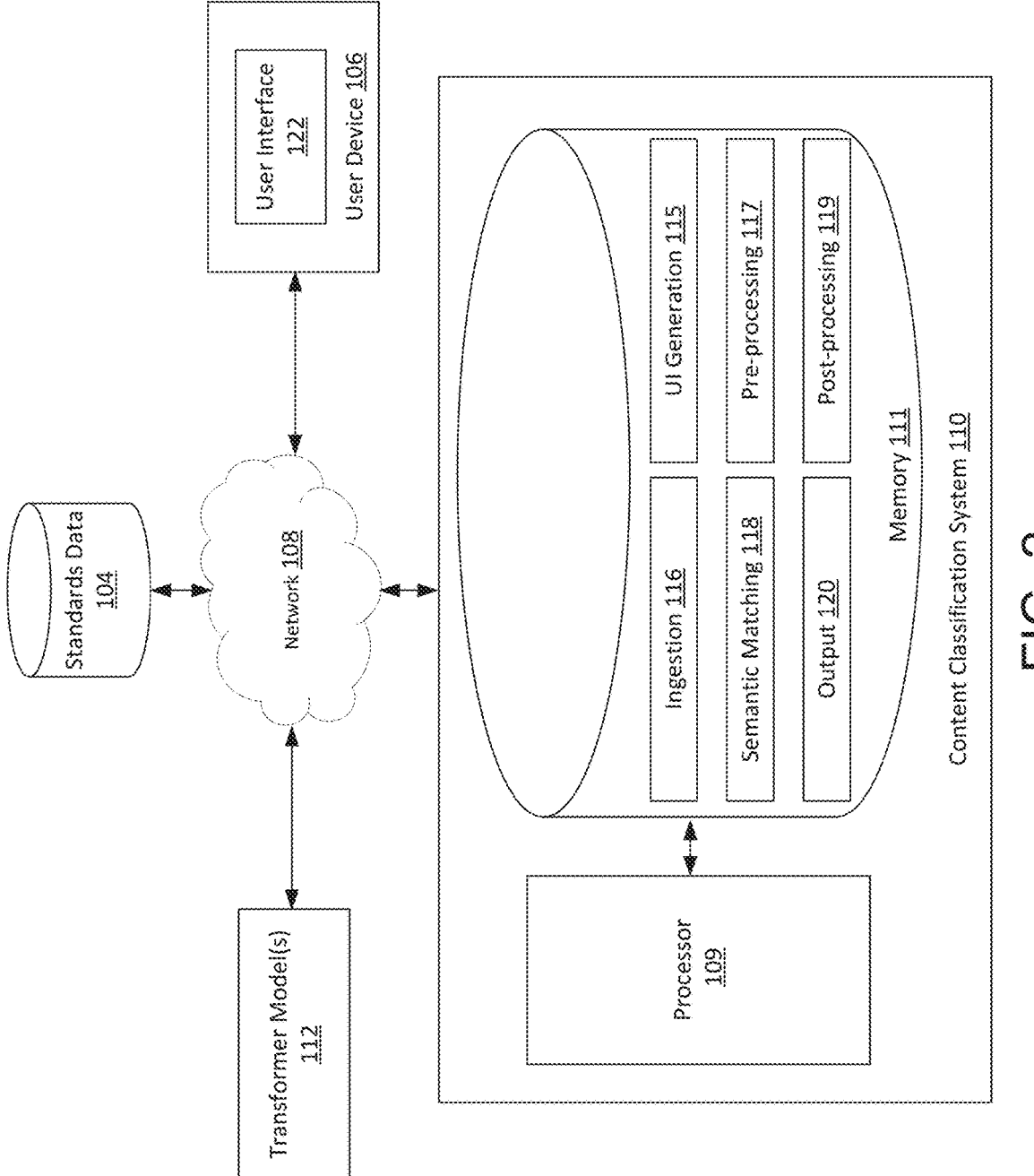
FIG. 2 illustrates a diagram of an example content classification system in accordance with some embodiments of the disclosure.

FIG. 2 illustrates a diagram of an example content classification system 110 in accordance with some embodiments of the disclosure. The content classification system 110 includes several logical sub-components, including ingestion 116, pre-processing 117, semantic matching 118, post-processing 119, and output modules 120. The content classification system 110 may generally receive user content for classification (e.g., via a user interface 122 of the user device 106) and process the user content to return one or more classifications for the user content. In some examples, the uploaded content may be preprocessed for use by the content classification system 110. In various examples, the content classification system 110 may do some preprocessing of content before classifying the content as described herein. Classifications may include, for example, one or more standards from a given set of standards applying to the user content. UI generation 115 may generally configure user interfaces for the user device 106 to provide information to, and receive information from, the content classification system 110. For example, UI generation 115 may configure various user interfaces displayed at the user interface 122 of the user device 106. One or more components of pre-processing 117 may parse the user content and create one or more numeric representations (e.g., high dimensional embeddings) of the user content. Semantic matching 118 and/or post-processing 119 may identify one or more standards applying to and/or defining classification of the user content based on comparisons between the numeric representations of the user content and numeric representations of the one or more standards. In various examples, output modules 120 may apply tags, display tags, and handle user feedback, in conjunction with UI generation 115, which may present such applicable standards to the user by configuring a user interface to be viewed via the user device 106.

As described above, the user device 106 may be a computing device associated with an end user or other user classifying various learning content using the content classification system 110. The content classification system 110 may communicate with the user device 106 over the network 108 to classify user content (e.g., educational content) according to various standards. The user interface 122 may allow a user to provide requests (e.g., user content and/or requests to categorize existing content) to the content classification system 110 and to view classifications, associated standards, and other data produced by the content classification system 110 based on such input. In various embodiments, the user interface 122 may be implemented as a React, JavaScript-based interface for interaction with the content classification system 110. The user interface 122 may provide instructions to the content classification system 110 to classify user content provided to the content classification system 110 according to a set of standards (or multiple sets of standards). The instructions may include, in various embodiments, user content (e.g., text of educational content), one or more sets of standards to use for classification of the user content, and other information used by the content classification system 110. The user interface 122 may also display one or more standards of a set of standards applicable to a piece of user content and/or a collection of multiple pieces of user content.

In various implementations, the content classification system 110 may include or utilize one or more hosts or combinations of compute resources, which may be located, for example, at one or more servers, cloud computing platforms, computing clusters, and the like. Generally, the content classification system 110 is implemented by compute resources including hardware for memory 111 and a processor 109. For example, the content classification system 110 may utilize or include one or more processors, such as a CPU, GPU, and/or programmable or configurable logic. In some embodiments, various components of the content classification system 110 may be distributed across various computing resources, such that the components of the content classification system 110 communicate with one another through the network 108 or using other communications protocols. For example, in some embodiments, the content classification system 110 may be implemented as a serverless service, where computing resources for various components of the content classification system 110 may be located across various computing environments (e.g., cloud platforms) and may be reallocated dynamically and automatically according to resource usage of the content classification system 110. In various implementations, the content classification system 110 may be implemented using organizational processing constructs such as functions implemented by worker elements allocated with compute resources, containers, virtual machines, and the like.

The memory 111 may include instructions for various functions of the content classification system 110 which, when executed by processor 109, perform various functions of the content classification system 110. Similar to the processor 109, memory resources utilized by the content classification system 110 may be distributed across various physical computing devices. Memory resources utilized for the memory 111 may include, in various examples, video random access memory (VRAM), random access memory (RAM), and the like.

In various embodiments, the memory 111 may include instructions implementing UI generation 116 when executed by the processor 109. UI generation 115 may communicate with various components of the content classification system 110 to provide information to, or receive information from, the content classification system 110. Such information may be used to configure various user interfaces, which may be presented, for example, via the user interface 122 of the user device 106. For example, UI generation 115 may configure user interfaces operable to obtain user content and/or various settings (e.g., an applicable set of standards, batching options, and the like) for classification by the content classification system 110. UI generation 115 may provide such information to other components of the content classification system 110 for identification of one or more standards applicable to the user content. UI generation may obtain the one or more standards from other components of the content classification system 110 and may configure various user interfaces to display applicable standards to a user. In some examples, UI generation 115 may obtain additional data for configuration of user interfaces from various storage locations, such as those storing user data 102 and/or standards data 104.

In various embodiments, the memory 111 may include instructions implementing data ingestion 116 when executed by the processor 109. Ingestion 116 may include various modules responsible for converting raw input files into standardized formats usable by other modules of the content classification system 110. In various examples, ingestion 116 includes a learning content ingestion module, which may determine how learning content is represented, ingested, and formatted, and may further parse raw learning content. For example, the learning content ingestion module may receive a tabular, semi-structured, or unstructured file containing learning content and associated metadata. The learning content ingestion module may, in some examples, output a JSON or other file adhering to a standard utilized by the content classification system 110.

Data ingestion 116 may further include an assessment content ingestion module, which may determine how assessment content is represented, ingested, and formatted. The assessment content ingestion module may also parse raw assessment content. For example, the assessment content ingestion module may receive a tabular, semi-structured, or unstructured file containing assessment content and associated metadata. The assessment content ingestion module may, in some examples, output a JSON or other file adhering to a standard utilized by the content classification system 110. Ingestion 116 may further include a taxonomic content ingestion module, which may determine how taxonomic content is represented, ingested, and formatted, as well as parsing raw taxonomic content. For example, the taxonomic content ingestion module may output a JSON or other file adhering to a standard utilized by the content classification system 110.

In various embodiments, the memory 111 may include instructions implementing pre-processing 117 when executed by the processor 109. In an exemplary implementation, the pre-processing 117 instructions stored by the memory 111 may cause the processor 109 to transmit user content to a text encoder (e.g., the USE model) to generate multidimensional feature vectors representing the user content and/or portions of the user content. Such feature vectors may be numeric representations of the user content. In some examples, the text encoder may be a transformer model 112 in communication with the content classification system 110 via the network 108. In various embodiments, other text encoders may be used, including custom text encoders included in the pre-processing 117 instructions. Further, other types of numeric encodings or representations may be used to represent the model knowledge assessment items. In some examples, text encoders used by pre-processing 117 may be local to the content classification system 110.

Pre-processing 117 may, in some examples, process user content to create input text to pass to transformer models for encoding. Such processing may include, for example, converting text from the user content into a string of input text by combining text from the user content with a query and connective text. Pre-processing 117 may perform other forms of textual augmentation of the user content, such as the addition of relevant key phrases, exemplar topics, or other units of content which are deemed similar by AI-based approaches (e.g., approaches described herein). In some examples, such processing may further include parsing and/or batching user content before the creation of the string of input text. For example, where user content includes a large volume of text (e.g., an entire textbook, chapter from a textbook, large set of assessment items, or the like), pre-processing 117 may break up the user content into multiple smaller pieces, and create an input string for each of the smaller pieces of content. In various examples, the content may be divided based on formatting (e.g., by paragraph, question numbering, headings, and the like), by length, or using other methods.

In various examples, text encoders utilized by pre-processing 117 may include a series of pre-trained transformer models to encode text-based content in vectorized features (e.g., numeric representations of the text-based content). Such transformer models may, in various examples, be pre-trained for information retrieval. Accordingly, the transformer models may process an input string generated by pre-processing 117 to convert query tokens created from the input string into feature vectors. Such feature vectors may be embeddings of the user content and may include various dimensions per feature vector. In some examples, pre-processing 117 may access an application programming interface (API) or other endpoints and/or interfaces to interact with a text encoder. For example, pre-processing 117 may access the OpenAI Embedding endpoint to access one or more GPT series models. Similar interfaces may be used to access other models, such as the BERT model, proprietary transformer models, and the like. Such models are shown in FIG. 2 as transformer models 112.

In various examples, pre-processing 117 may include several modules, such as a feature engineering module, a discrete augmentation module, a content decomposition module, a content elaboration module, an embedding module, and a continuous augmentation module. More modules may be included in pre-processing 117 in various examples. A subset of the modules listed above may be included in pre-processing 117 in various examples. A feature engineering module may generally produce additional structured metadata features from content in any form throughout the content classification system 110. A discrete augmentation module may produce modified input textual content by inserting related textual content into the input textual content. A discrete augmentation module may, in various examples, use automated keyword extraction and insertion into text-based content and/or may use GPT-3 completions to extend content. A content decomposition module may decompose textual content into textual constituent parts. In various examples, a content decomposition module may use a GPT-3 completion endpoint to automatically decompose taxonomic content. A content elaboration module may produce additional related textual content given some unit of input textual content. The content elaboration module may, in some examples, use GPT-3 completion endpoints to generate exemplars for taxonomic content. An embedding module may generally produce a dense vector representation of input textual content. For example, the embedding module may include an OpenAI embedding endpoint or an open source transformer-based embedding engine. A continuous augmentation module may generally perform transformations on embedding vectors. In various examples, the continuous augmentation module may be a triplet-loss-trained distortion model trained on ground truth data in order to adjust embedding vectors.

In various examples, the memory 111 may include instructions implementing semantic matching 118 when executed by the processor 109. Generally, semantic matching 118 modules may, given two pieces of content, produce a semantic match score between the pieces of content. Such a semantic match score (also referred to herein as a match score) may be utilized by the content classification system 110 to identify, for example, one or more standards of a set of standards which are applicable to a piece of content, such as learning or assessment content.

Semantic matching 118 may, in some examples, generate match scores quantifying a match between user content and one or more standards of a set of standards. In some examples, semantic matching 118 may return all standards associated with a match score above some threshold value, with the highest match score being returned as the "primary" standard associated with the user content. In some examples, semantic matching 118 may return a specific number of matching standards regardless of the numeric match score. In some examples, standard identification 120 may further return the match score, a percentage match, a confidence interval, or other metrics to indicate to the user the relevance of the match between the user content and the standard.

The match score may be determined, in various examples, using a similarity function between a numeric representation of the user content and numeric representations of the standards of the set of standards. Generally, a similarity function may be a function which assigns two numeric representations (e.g., vectors) a number between $-1$ and $1$, where $-1$ reflects complete dissimilarity, $0$ reflects semantic independence, and $1$ reflects complete similarity. One such function is cosine similarity, which measures the cosine of the angle between two vectors using an inner product of the two vectors. In some examples, the inner product may be a Euclidian inner product, through alternative inner products may be used, including inner products learnable by machine learning methods or algorithms. In some examples, the match score may be an aggregate of several different similarity functions, which may themselves act on several sources of information, all of which may be relevant to the user content and/or standard(s) in question. For example, a single standard may be broken into several constituent components, each of which may be embedded into a numeric feature vector, scored separately against the embedded content vector. Such separate scores may be aggregated (e.g., averaged) to produce the match score between the content and the original standard. In various examples, other similarity functions, such as a positive label probability of a binary relevance classifier and/or a comparison of the likelihood of generating one piece of content when conditioned on the other piece of content to the likelihood of generating the other piece of content without conditioning may be used. Such similarity functions may, in some examples, utilize a Generative transformer model.

For example, the numeric representations of both the user content and the standards may capture features of the text that would not be readily observable by humans. Accordingly, the comparison between the numeric representations may compare features not otherwise observable by humans, resulting in more meaningful and/or accurate matching. In some examples, feature vectors created using pre-processing 117 may be further processed to create conditioned probability tokens. For example, the feature vectors may be further processed to produce probabilities for each query token, conditioned on the document text. The conditioned probability tokens may be compared to unconditioned probability tokens, and such comparisons may be aggregated into the match score. Unconditioned probability tokens may, in various examples, be created by processing the input string itself. In some examples, the match score may be determined based on a theoretical distance between the feature vector representing the user content and various feature vectors representing standards of the set of standards. In such examples, the standard closest to the user content may be returned as the primary standard and other standards may be returned based on their respective distances to the user content.

In some examples, the match score may be determined using a generative model. For example, a generative model may be provided with text of a piece of user content and text of a standard and may return an indicator of whether the piece of user content likely falls under the standard. In some examples, the generative model may return a binary output (e.g., a yes or no answer), a numeric output (e.g., a score indicating likelihood of a match between a given standard and a piece of user content), and the like. In another example, a standard may be provided to a generative model with a prompt to generate content corresponding to the given standard. In such examples, pre-processing 117 may then generate numeric representations of such model generated content and compare the numeric representations of the model generated content to the numeric representations of the piece of user content to generate the match score. Such comparison of numeric representations may be conducted using similar methods as those described herein for comparison of numeric representations of standards with numeric representations of content items. In some examples, scores or other indicators determined using generative models may be aggregated with other similarity scores to determine a final match score for a piece of user content and a standard.

A generative model may further, in various examples, provide additional information in addition to a match score or indicator regarding the match between a given standard and a piece of user content. For example, the generative model may provide a narrative explanation of why a particular standard does or does not match a piece of content.

In various examples, the memory 111 may include instructions implementing post-processing 119 when executed by the processor 109. Post-processing 119 may, in various examples, include several sub-modules, such as semantic score post-processing, semantic score calibration semantic score aggregation, conditional probability, and confidence modules. Generally, the various sub-modules of post-processing 119 may utilize the semantic match score generated by semantic matching 118 to perform various functions of post-processing 119, which may aggregate, supplement, and/or otherwise alter the semantic match score for further use in tagging by output 120.

The functionality of sub-modules of post-processing 119 is exemplary and may vary in some examples. For example, one module may perform the functions of multiple of the described sub-modules and/or post-processing 119 may omit the functionality of one or more described sub-modules. Semantic score post-processing may modify semantic match scores to incorporate any additional semantic information. Semantic score calibration may adjust semantic match scores into a predefined scale. For example, given a ground-truth dataset, semantic score calibration may standardize subsequent semantic match scores according to the mean and standard deviation of scores on the ground truth set. Semantic score aggregation may produce a new semantic match score given a set of semantic match scores. For example, semantic score aggregation may aggregate scores against a taxonomic unit's children in order to produce a score against the unit itself. In another example, semantic score aggregation may aggregate scores across several units of textbook content (e.g., paragraphs) in order to produce a score against enclosing spans (e.g., sections, chapters, and the like). Conditional probability may, given semantic match scores between units and hierarchical information, produce semantic match scores. For example, conditional probability may scale a semantic match score against a taxonomic unit according to the magnitude of the semantic match score against its parent unit in the taxonomy. A confidence module may produce a measure of confidence that two units of content are related. For example, a confidence module may utilize discrete confidence bins to classify the confidence measure as highly confident, somewhat confident, or not at all confident. A confidence module may further utilize a continuous confidence measure. For example, a confidence value of 0.9 may mean that, with reference to some ground truth set, a given semantic match score at least as large as 0.9 has a 90% chance of being a true match.

In various examples, the memory 111 may include instructions implementing output modules 120 when executed by the processor 109. The output modules 120 may, in various examples, include several sub-modules, such as tagging, insights and visualization, and user feedback modules. In various examples, output modules 120 may communicate with UI generation 115 to display information to an end user through a user interface. For example, tagging may house the logic which applies tags between sets of content, given information from semantic matching modules and confidence modules. Tagging may, in various examples, rank semantic match scores and return top three results as primary, secondary, and tertiary tags. Tagging may tag all scores above a given threshold (determined, e.g., by the confidence module of post-processing 119) as highly confident and all scores above a lower threshold (also determined, e.g., by the confidence module of post-processing 119) and somewhat confident.

Output modules 120 may further include an insights and visualization sub-module, which may be responsible for creating and communicating display results for display by UI generation 115. For example, display results may include a histogram view and/or density plot, automatic taxonomic gap detection, and/or other automatic data-analytic insights gleaned from other display results. A user feedback module may receive (e.g., from user interaction with a user interface presented by UI generation 115) user validation and feedback and may determine how such validation and/or feedback is utilized by the content classification system 110 to improve other modules of the content classification system 110. For example, a user may validate a tag as appropriate or inappropriate. Such validation may be propagated backwards throughout all modules responsible for making tagging and confidence decisions.

In various examples, the content classification system 110 may include additional components and/or logical functions not depicted in FIG. 2. For example, the memory 111 may include instructions implementing filtering of content when executed by the processor 109. Such filtering may, for example, flag or otherwise call out to a user certain content which may be viewed as sensitive for a particular group of users. For example, content may be filtered for grade level appropriateness based on keywords, phrases, concepts, and other elements present in the content. In various examples, such filtering may utilize an additional transformer model and may be filtered based on user selected thresholds representing, safe, sensitive, and/or unsafe content.

Though not depicted in FIG. 2, the content classification system 110 may include or interact with additional software or hardware components for various functions. For example, an authorization service may be utilized to connect user devices to the content classification system 110. Users may sign into the content classification system 110 and may be directed to an authorization service. Upon authorization, the user may access data and use the user interface 122 to interact with the content classification system 110. In another example, the content classification system 110 may be accessible by means other than the user interface 122. For example, various users may connect to the content classification system 110 through, for example, command line instructions, and may provide commands to the content classification system 110 through scripts, text commands, or means other than a user interface 122. Additional services and/or applications may be utilized by the content classification system 110 to perform functions such as querying databases, communicating between components, managing compute resources delegated to the content classification system 110, and other functions.

Figure 3:
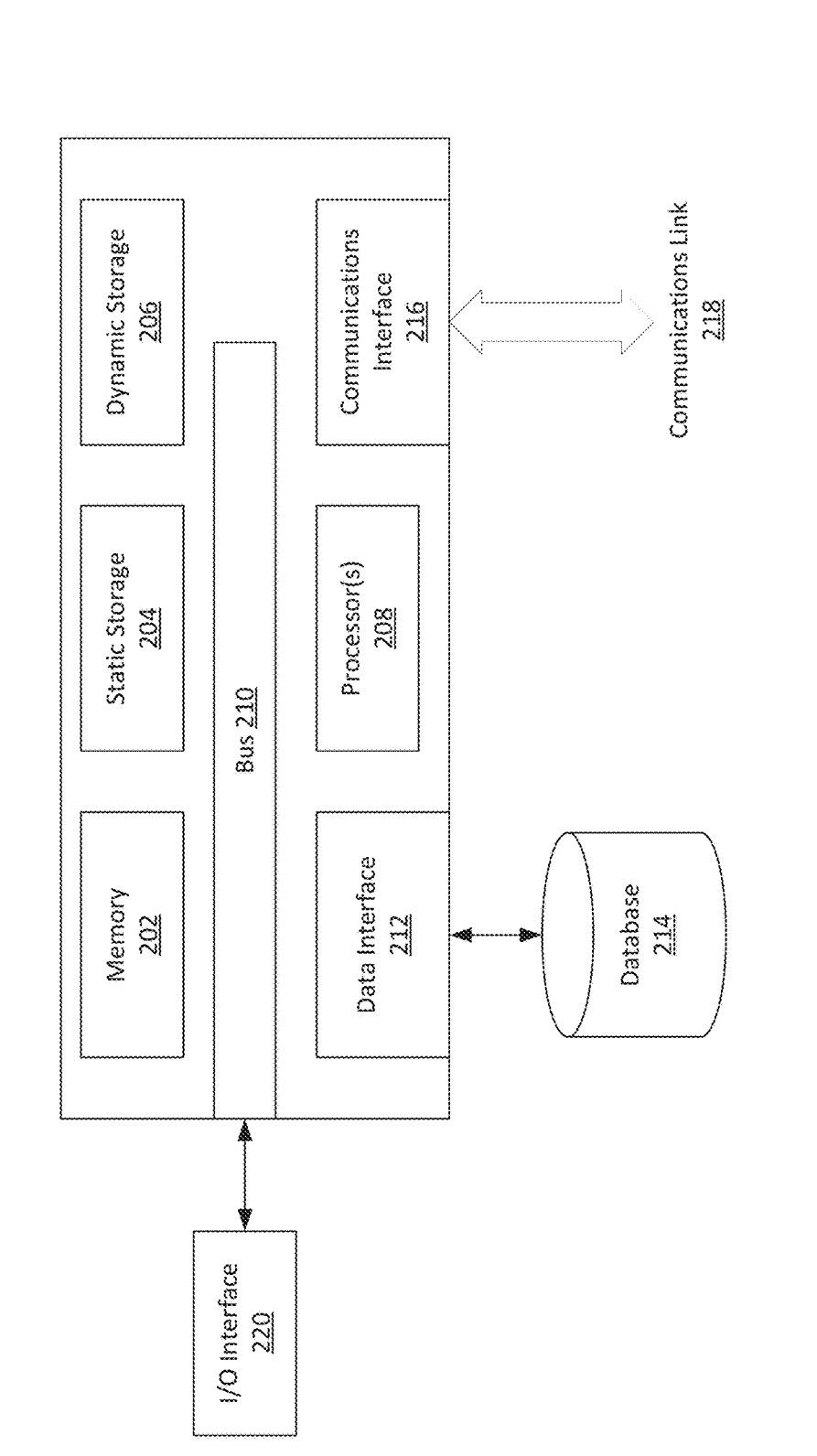
FIG. 3 is a schematic diagram of an example computer system which may be used to implement various embodiments in the examples described herein.

The content classification system 110 may be implemented using various computing systems. Turning to FIG. 3, an example computing system 200 may be used for implementing various embodiments in the examples described herein. For example, processor 109 and memory 111 may be located at one or several computing systems 200. In various embodiments, user device 106 is also implemented by a computing system 200. This disclosure contemplates any suitable number of computing systems 200. For example, the computing system 200 may be a server, a desktop computing system, a mainframe, a mesh of computing systems, a laptop or notebook computing system, a tablet computing system, an embedded computer system, a system-on-chip, a single-board computing system, or a combination of two or more of these. Where appropriate, the computing system 200 may include one or more computing systems; be unitary or distributed; span multiple locations; span multiple machines; span multiple data centers; or reside in a cloud, which may include one or more cloud components in one or more networks.

Computing system 200 includes a bus 210 (e.g., an address bus and a data bus) or other communication mechanism for communicating information, which interconnects subsystems and devices, such as processor 208, memory 202 (e.g., RAM), static storage 204 (e.g., ROM), dynamic storage 206 (e.g., magnetic or optical), communications interface 216 (e.g., modem, Ethernet card, a network interface controller (NIC) or network adapter for communicating with an Ethernet or other wire-based network, a wireless NIC (WNIC) or wireless adapter for communicating with a wireless network, such as a WI-FI network), and/or input/output (I/O) interface 220 (e.g., keyboard, keypad, mouse, microphone). In particular embodiments, the computing system 200 may include one or more of any such components.

In particular embodiments, processor 208 includes hardware for executing instructions, such as those making up a computer program. The processor 208 circuitry includes circuitry for performing various processing functions, such as executing specific software for performing specific calculations, logic operations, or tasks. In particular embodiments, I/O interface 220 includes hardware, software, or both, providing one or more interfaces for communication between computing system 200 and one or more I/O devices. Computing system 200 may include one or more of these I/O devices, where appropriate. One or more of these I/O devices may enable communication between a person and computing system 200.

In particular embodiments, communications interface 216 includes hardware, software, or both providing one or more interfaces for communication (such as, for example, packet-based communication) between computing system 200 and one or more other computer systems or one or more networks. One or more memory buses (which may each include an address bus and a data bus) may couple processor 208 to memory 202. Bus 210 may include one or more memory buses, as described below. In particular embodiments, one or more memory management units (MMUs) reside between processor 208 and memory 202 and facilitate accesses to memory 202 requested by processor 208. In particular embodiments, bus 210 includes hardware, software, or both coupling components of computing system 200 to each other.

According to particular embodiments, computing system 200 performs specific operations by processor 208 executing one or more sequences of one or more instructions contained in memory 202. For example, instructions for UI generation 116, content processing 118, and standard identification 120 may be contained in memory 202 and may be executed by the processor 208. Such instructions may be read into memory 202 from another computer readable/usable medium, such as static storage 204 or dynamic storage 206. In alternative embodiments, hard-wired circuitry may be used in place of or in combination with software instructions. Thus, particular embodiments are not limited to any specific combination of hardware circuitry and/or software. In one embodiment, the term "logic" shall mean any combination of software or hardware that is used to implement all or part of particular embodiments disclosed herein.

The term "computer readable medium" or "computer usable medium" as used herein refers to any medium that participates in providing instructions to processor 208 for execution. Such a medium may take many forms, including but not limited to, nonvolatile media and volatile media. Non-volatile media includes, for example, optical or magnetic disks, such as static storage 204 or dynamic storage 206. Volatile media includes dynamic memory, such as memory 202.

Computing system 200 may transmit and receive messages, data, and instructions, including program, e.g., application code, through communications link 218 and communications interface 216. Received program code may be executed by processor 208 as it is received, and/or stored in static storage 204 or dynamic storage 206, or other storage for later execution. A database 214 may be used to store data accessible by the computing system 200 by way of data interface 212. For example, user data 102 and/or standards data 104 may each be stored using a database 214.

User Interfaces of the Content Classification System

Figure 4A:
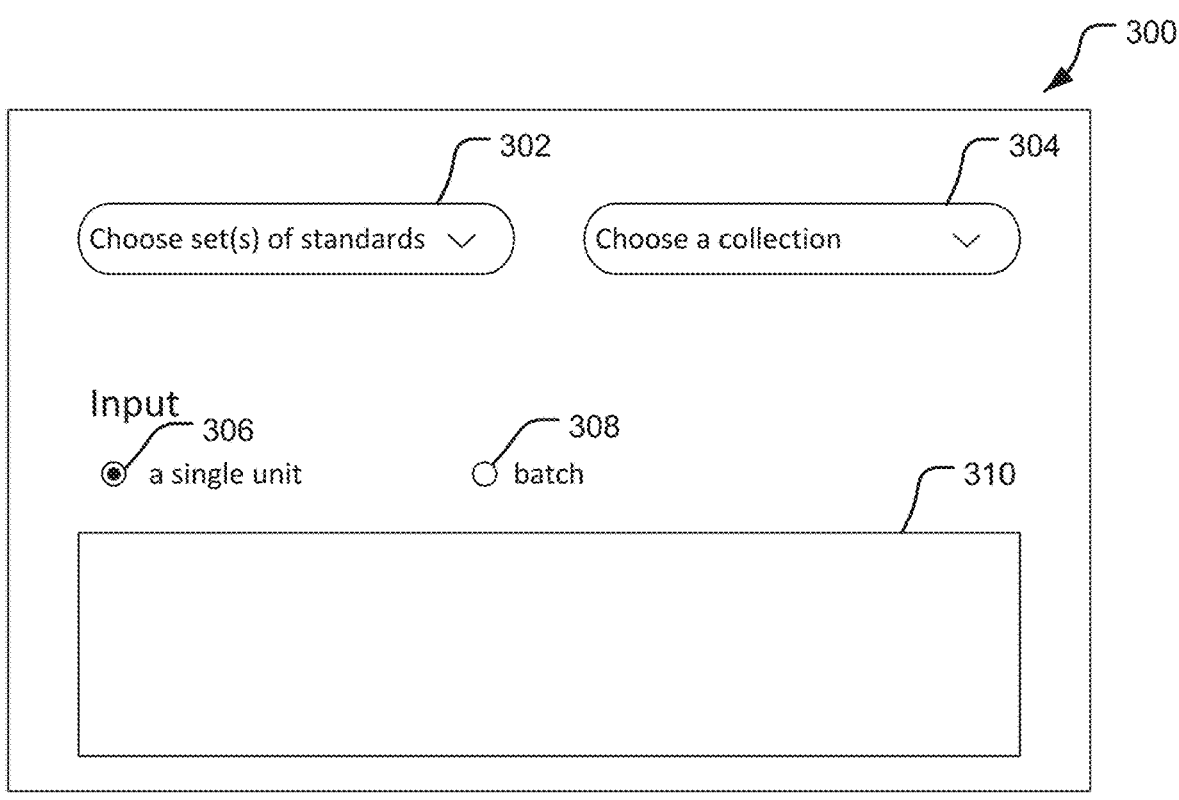
FIG. 4A illustrates an example user interface configured for providing user content to a content classification system in accordance with some embodiments of the disclosure.

FIG. 4A illustrates an example user interface 300 configured for providing user content 102 to the content classification system 110. The user interface 300 may, in various examples, be configured and/or generated by UI generation 115 and provided to a user via the user interface 122 of the user device 106. The user interface 300 includes an element 302 configured for a user to select a set of standards for the content classification system 110 to apply to the user content. Though shown as a drop-down menu, the element 302 may be another interface element operable for the user to select an option from multiple options. In various examples, the standards presented when the user selects the element 302 may be configured for the user based on user settings. For example, the geographic location of a user may be used to determine what standards are available to a user.

The user interface 300 further includes an element 304 configured for a user to select a collection in which to place the user content (and/or its corresponding applicable standards). In various examples, collections may be used to organize and group together various pieces of user content. For example, a collection may be used to group together assessment items intended to form an assessment (e.g., a test). Collections may also be used to group together instructional content intended to be presented as a unit, such as content for a course, content for a portion of a course, and the like. Generally, grouping content using collections may allow for visualization (e.g., using a user interface such as the user interface 340 shown in FIG. 5) of which standards are covered by content in a particular collection. Such visualizations may be helpful for ensuring that test content covers intended topics, ensuring that students in a course are presented with learning materials covering all (or a selected portion of) intended content topics in all (or a selected portion of) applicable standards, and the like.

The user interface 300 further includes elements 306 and 308 enabling a user to select whether uploaded and/or typed content corresponds to a single unit or to a batch of user content items. When element 306 is selected, the content classification system 110 may treat the text as one content item. For example, content processing 118 may not parse the user input into smaller pieces of user content when element 306 is selected. When element 308 is selected, the content classification system 110 may attempt to parse the input into multiple pieces of user content, depending on the size of the user input. For example, where the text of an entire textbook is provided to the content classification system 110 with element 308 selected, ingestion 116, pre-processing 117 and/or other components of the content classification system 110 may break the input into more pieces of user content compared to a case where a chapter of a textbook is provided to the content classification system 110 with element 306 selected. Accordingly, a user may provide one, large piece of content (e.g., a textbook) to the content classification system 110 without first breaking down the large piece of content into smaller pieces. Further, classification may be more accurate when classifying smaller portions of content instead of one large piece of content. For example, the numerical representation of a small portion of content may capture more subtle concepts included in the content.

A textbox 310 is further provided in the user interface 300. In various examples, the textbox 310 may be utilized by a user to provide text input directly to the content classification system 110. In various examples, other elements may be provided at the user interface 300 for providing user content to the content classification system 110. For example, the user interface 300 may include options to upload or link files to the content classification system 110.

Figure 4B:
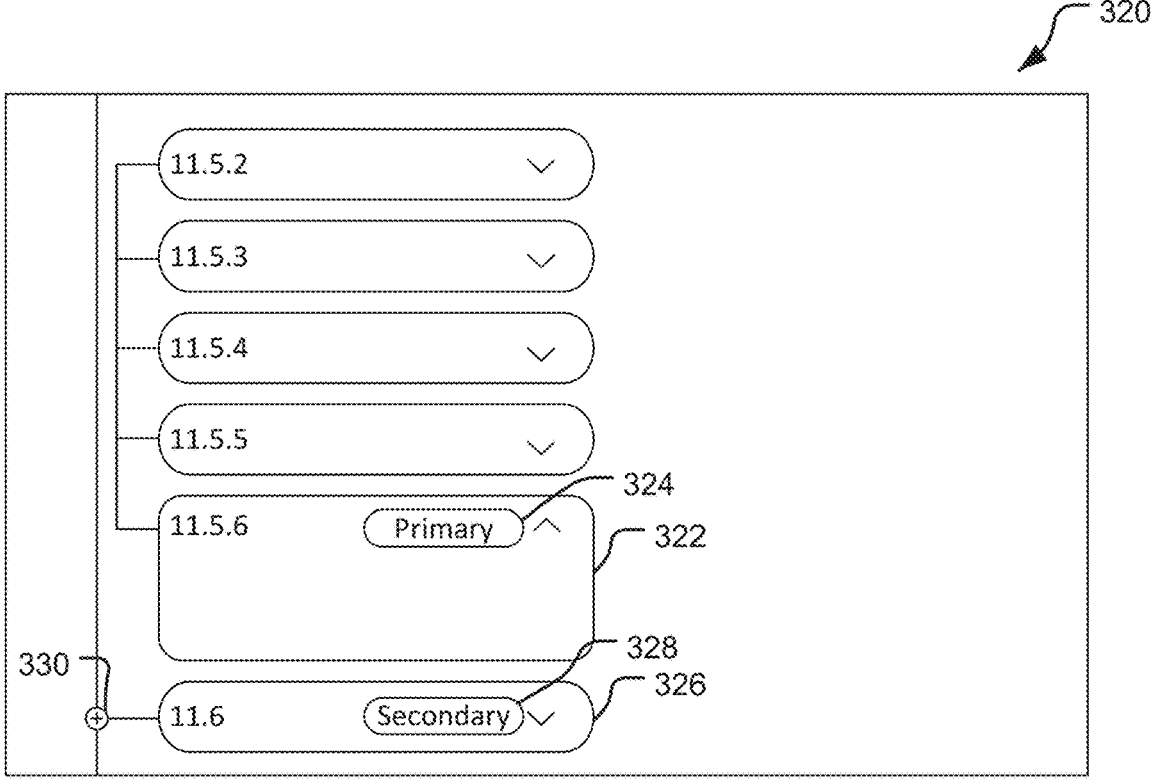
FIG. 4B illustrates an example user interface showing classification results provided by the content classification system in accordance with some embodiments of the disclosure.

FIG. 4B illustrates an example user interface 320 showing classification results provided by the content classification system 110. The user interface 320 may, in various examples, be configured and/or generated by UI generation 115 and provided to a user via the user interface 122 of the user device 106. The user interface 320 may display one or more standards applicable to a piece of user content. In various examples, the user interface 320 may allow the user to interact with and view the larger taxonomy of the set of standards. For example, as shown in FIG. 4B, the user may view that standards 11.5.2, 11.5.3, 11.5.4, 11.5.5, and 11.5.6 are at the same taxonomic level or rank with respect to the set of standards. In some examples, the highest taxonomic level of standards may be shown collapsed in the user interface 320 and the user interface 320 may include elements selectable to expand the highest taxonomic level of standards, showing other standards below the highest level standard. For example, standard 11.6 is shown as collapsed. However, a user may select element 330 to expand standard 11.6 to display standards 11.6.1, 11.6.2, and so on.

In various examples, the user interface 320 may display which standards are applicable to a piece of user content using tags, such as tag 324 showing that standard 322 is the primary standard applicable to the user content and tag 328 showing that standard 326 is a secondary standard applicable to the user content.

Figure 5:
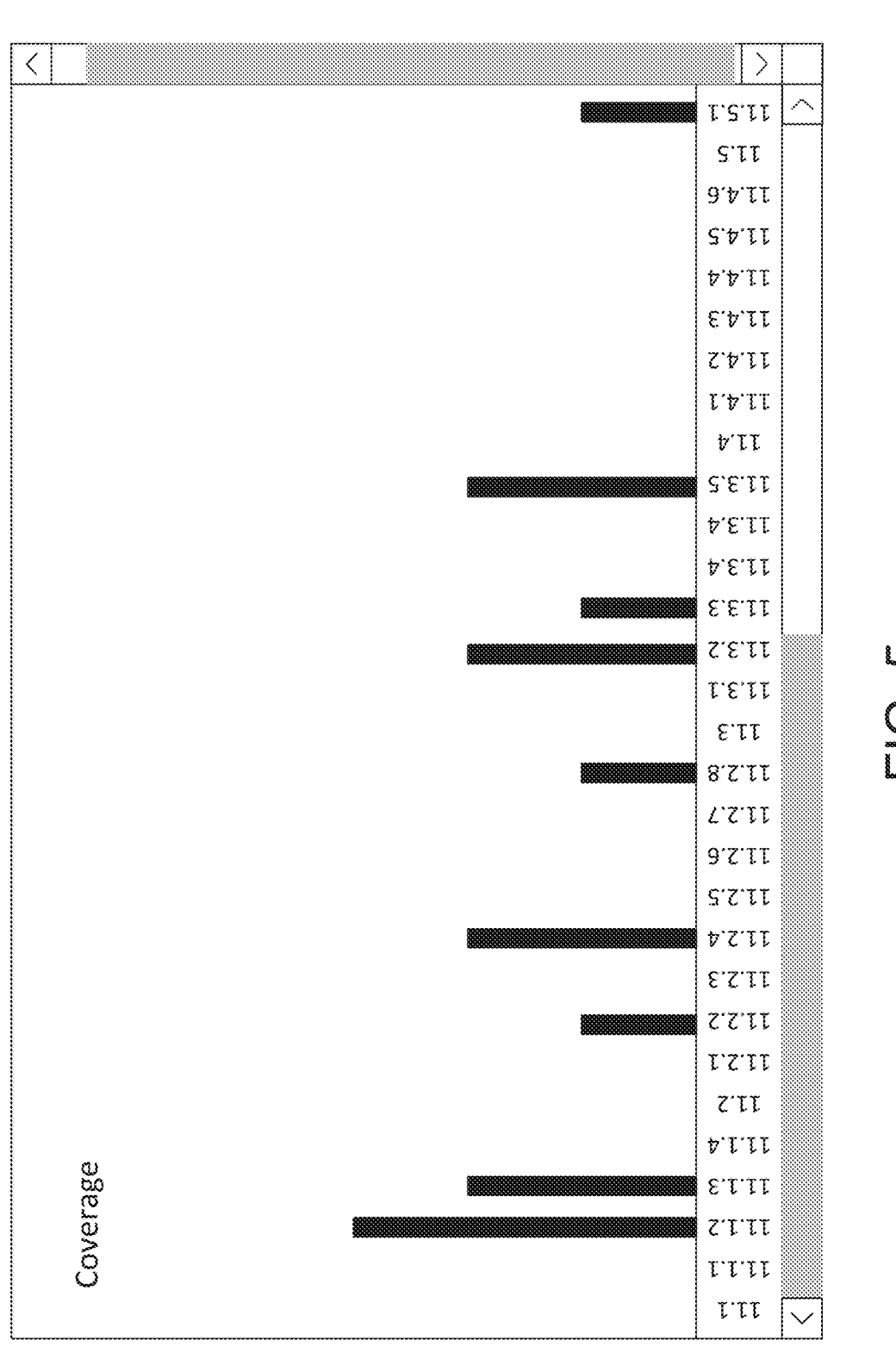
FIG. 5 illustrates an example user interface showing classification results provided by the content classification system for multiple pieces of user content in accordance with some embodiments of the disclosure.

FIG. 5 illustrates an example user interface 340 showing classification results provided by the content classification system 110 for multiple pieces of user content. The user interface 340 may, in various examples, be configured and/or generated by UI generation 115 and provided to a user via the user interface 122 of the user device 106. In various examples, the user interface 340 may be configured with respect to a collection and/or grouping of user content. Such collections may be created by a user at input (e.g., at content upload at user interface 300) and/or may be created by the content classification system 110 when large portions of content are uploaded at one time. For example, where a user provides a textbook to the content classification system 110 through user interface 300, ingestion 116, pre-processing 117, and/or other components of the content classification system 110 may break the text of the textbook into smaller content portions, which may be organized by the content classification system 110 into a collection.

The user interface 340 may generally show which standards of a set of standards are applicable to content in a collection of content. By displaying such information in a single user interface 340, a user may be able to quickly ascertain where there are gaps in assessment content and/or instructional content (relative to the standard). This can be an important insight to evaluators. For example, where the user interface 340 shows that no content matches a particular standard, a user may elect to add additional content to the collection in order to fill in the gaps for instructional and/or assessment purposes. Though the user interface 340 displays information using a bar graph, other types of graphics, charts, graphs, and the like may be used to convey standards coverage information. For example, a user interface may display standards coverage with a pie chart, table, or other visual elements.

Methods for Content Classification Using the Content Classification System.

Figure 6:
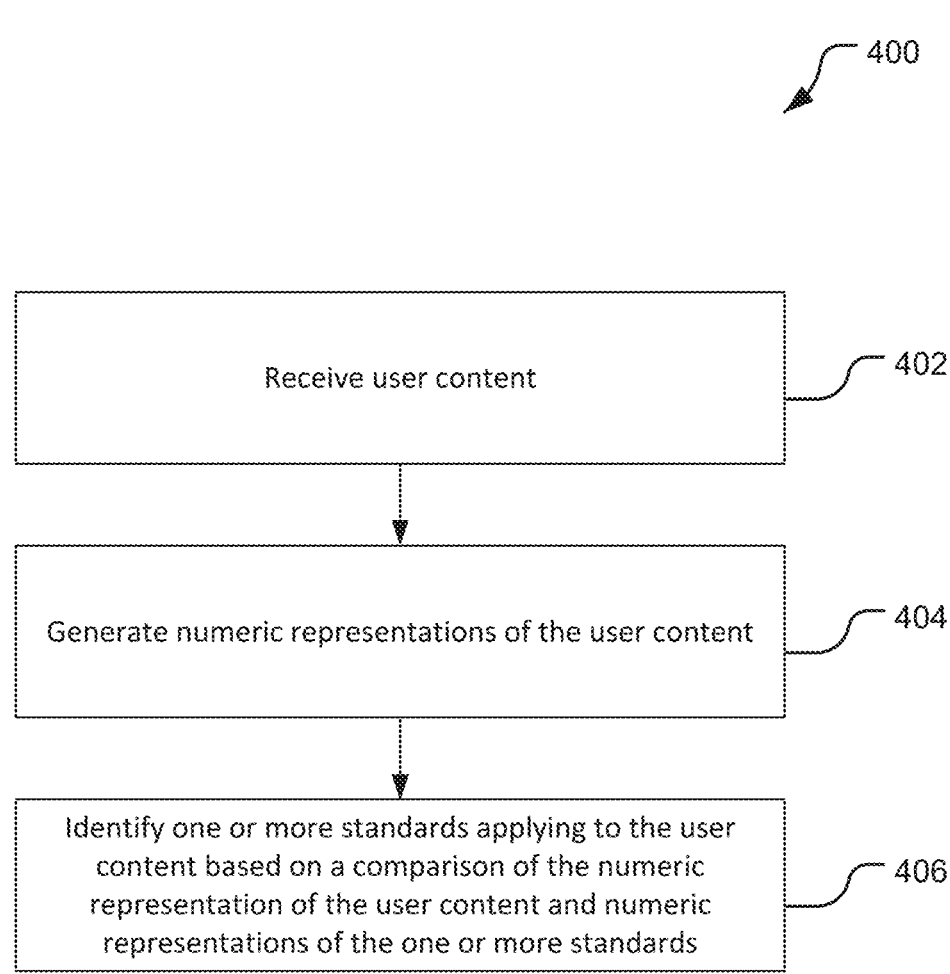
FIG. 6 illustrates an example process for classifying user content into one or more standards based on taxonomy data.

FIG. 6 illustrates an example method 400 of classifying user content into one or more standards from a given taxonomy. At block 402, the content classification system 110 receives user content. The content classification system 110 may receive user content in various ways. In some examples, UI generation 115 may generate a user interface (e.g., user interface 300) configured to allow a user to provide user content to the content classification system 110 by entering text, uploading content, selecting content, and the like. In some examples, a user may select content already uploaded to a system including the content classification system 110 and/or content generated by a system in communication with the content classification system 110. For example, content, including learning assessment content, may be generated by a system including a natural language generator interface described in U.S. Provisional Application No. 63/215,794, filed on Jun. 28, 2021, and entitled INTERFACE TO NATURAL LANGUAGE GENERATOR FOR GENERATION OF KNOWLEDGE ASSESSMENT ITEMS, which application is incorporated herein by reference for all purposes.

The content classification system 110 (e.g., pre-processing 117) generates numeric representations of the user content at block 404. In various examples, UI generation 115 may provide such user content to ingestion 116, which may then provide standardized formats of content to pre-processing 117 for generation of numeric representations of the user content. Pre-processing 117 may generally use a transformer model to generate numeric representations, such as encoding vectors of the user content. In various examples, ingestion 116 and/or pre-processing 117 may perform some preprocessing of content before providing the user content to a transformer model. For example, ingestion 116 may parse text from user content that is not or does not include text content, such as PDF content, audio content, video content, and the like. In some examples, ingestion 116 and/or pre-processing 117 may further break up batched content into smaller, individual pieces of user content for processing. Ingestion 116 and/or pre-processing 117 may identify such content based on length (e.g., text content beyond a certain length may be automatically broken down into smaller pieces) and/or based on user input, such as user selection of a batching option (e.g., selection of element 308 at the user interface 300).

In some examples, pre-processing 117 may also generate numeric representations of the standards of a selected set of standards. For example, where a set of standards has not yet been utilized by a user and/or by the content classification system 110, pre-processing 117 may provide the standards to a transformer model to generate numeric representations of the standards. Where pre-processing 117 generates numeric representations of both the user content and the standards, pre-processing 117 may provide both the numeric representation of the user content and the numeric representations of the standards to semantic matching 118 for further classification analysis.

At block 406, the content classification system 110 (e.g., semantic matching 118 and post-processing 119, and/or output 120) identifies one or more standards applying to the user content based on a comparison of the numeric representation of the user content and numeric representations of the one or more standards. In some examples, semantic matching 118 may receive the numeric representations of user content and the numeric representations of all standards of a selected set of standards from pre-processing 117. In some examples, semantic matching 118 may receive the numeric representation of user content from pre-processing 117 and may retrieve the numeric representations of the standards from another location. For example, standard identification may access numeric representations of the standards from standards data 104, which may be accessible via, for example, the network 108.

Generally, semantic matching 118, post-processing 119, and/or output 120 may identify one or more standards of a set of standards applicable to user content by comparing the numeric representation of the user content to numeric representations of all of the standards of the set of standards. In some examples, semantic matching 118 may compare the numeric representation of the user content to the numeric representations of the standards by generating a match score (e.g., a semantic match score) reflecting the level of similarity between the numeric representation of the user content to a respective numeric representation of a standard. In some examples, the match score may be generated using a similarity function. In some examples, feature vectors created using pre-processing 117 may be further processed to create conditioned probability tokens. For example, the feature vectors may be further processed to produce probabilities for each query token, conditioned on the document text. The conditioned probability tokens may be compared to unconditioned probability tokens, and such comparisons may be aggregated into the match score. Unconditioned probability tokens may, in various examples, be created by processing the input string itself. In some examples, the match score may be determined based on a theoretical distance between the feature vector representing the user content and various feature vectors representing standards of the set of standards. In such examples, the standard closest to the user content may be returned as the primary standard and other standards may be returned based on their respective distances to the user content.

After generating the match score, output 120 may determine which of the standards of the set of standards are most likely to apply to the user content. For example, the standards associated with higher match scores may be more closely correlated to the user content such that standards with higher match scores are more likely to apply to the user content. In some examples, output 120 may rank the various standards based on the match score and may identify the one or more applicable standards based on such ranking. For example, output 120 may, in some examples, identify all standards having a match score above a certain threshold. In other examples, output 120 may identify a certain number of standards by relative ranking, regardless of the value of the match score. In some examples, output 120 may further utilize information from a hierarchy for standard identification. For example, if several "sibling" standards all have high match scores, a confidence level in any one sibling may be decreased, while a confidence level in the primary or "parent" standard of the sibling standards may be increased.

Once the one or more standards are identified, the content classification system 110 may store such standards (e.g., by tagging the user content to indicate applicable standards and storing the results, for example, with user data 102) and/or display the identified standards to the user (e.g., through user interface 122 of the user device 106). For example, output 120 may provide the identified standards to UI generation 115, which may display the results in a user interface, such as user interfaces 320 and/or 340.

Figure 7:
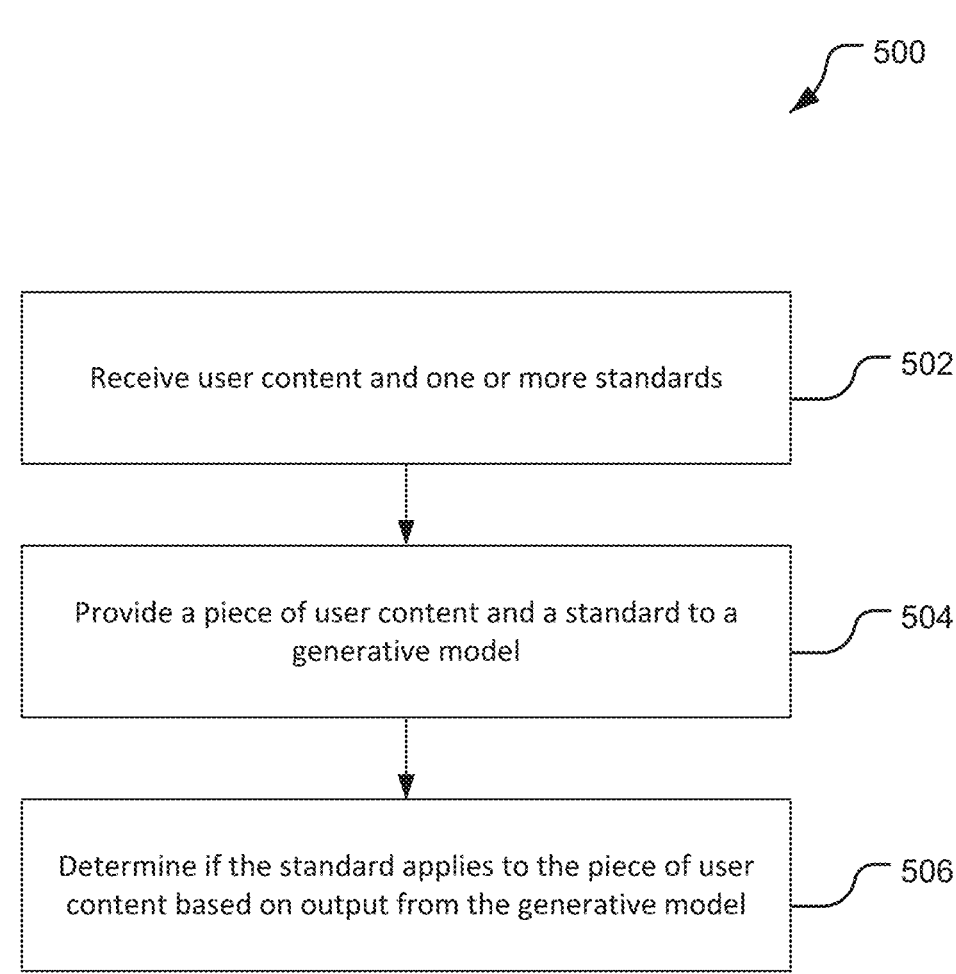
FIG. 7 illustrates an example process for classifying user content into one or more standards and presenting such standards via a user interface.

FIG. 7 illustrates an example method 500 of classifying user content into one or more standards from a given taxonomy. At block 502, the content classification system 110 receives user content and one or more standards. The content classification system 110 may receive the user content and the one or more standards in the same or similar manners as those described with respect to block 402 of the method 400. For example, a user may provide standards and/or content via a user interface generated by UI generation 115. In some examples, the user content and the one or more standards may be provided separately to the content classification system 110.

The content classification system 110 provides a piece of user content and a standard to a generative model at block 504. In various examples, ingestion 116 and/or pre-processing 117 may perform some preprocessing of the user content and the standard before providing the user content and the standard to the generative model, such as parsing text, breaking up batched content, and the like. The content classification system 110 may provide the piece of user content and the standard to the generative model using a prompt instructing the model to compare the content item to the standard and generate some output indicating whether the standard applies to the content item. In some examples, the prompt may further include instructions for the generative model to produce a specific type of output based on whether the standard applies to the content (e.g., a score on a certain scale or a binary answer).

At block 506, the content classification system 110 determines if the standard applies to the piece of user content based on output from the generative model. For example, the content classification system 110 may utilize a cutoff score for determining whether a standard applies to a piece of user content. In some examples, the content classification system 110 may utilize the output from the generative model along with other similarity measures (e.g., those generated by the method 400) to determine if a standard applies to a piece of user content. In various examples, the method 500 may be repeated to determine whether multiple standards apply to a particular piece of user content and/or a plurality of user content.

FIG. 8 illustrates an example method 600 for classifying user content into one or more standards and presenting such standards via a user interface. At block 602, the content classification system 110 receives, via a user interface, first user content of a content grouping for classification according to a set of standards. The content classification system 110 may receive the first user content through a user interface such as the user interface 300. In various examples, UI generation 115 may generate the user interface 300 and may pass the user content received via the user interface 300 to other components of the content classification system 110, such as ingestion 116. In various examples, the content classification system 110 may further receive user preferences, a selection of a set of standards for classification, and other similar information via the user interface 300 at block 602. The content classification system 110 provides, via the user interface, one or more identified standards of the set of standards for the first user content at block 604. In various examples, the content classification system 110 may identify the one or more standards using the method 400 described with respect to FIG. 6. In some examples, the content classification system 110 (e.g., UI generation 116) may display the one or more identified standards for the first user content.

At block 606, the content classification system 110 receives, via the user interface, second user content of the content grouping for classification according to the set of standards. In some examples, the content classification system 110 may receive the second user content at the same time the content classification system 110 receives the first user content. For example, both the first user content and the second user content may be provided via the user interface 300 with option 308 for batch content selected. In other examples, the second user content may be provided after the first user content is provided to and/or standards are identified for the first user content by the content classification system 110. The content classification system 110 provides, via the user interface, one or more identified standards of the set of standards for the second user content at block 608. In various examples, the content classification system 110 may identify the one or more standards using the method 400 described with respect to FIG. 6.

At block 610, the content classification system 110 provides, via the user interface, identified standards for content of the content grouping. For example, UI generation 115 may generate the user interface 340, or a similar user interface, showing standards applicable to each of the pieces of user content in the collection (e.g., particular pieces of content may be associated or tagged with one or more tags used in a set of standards), including the first user content and the second user content. In some examples, the user interface 340 may include the one or more standards applicable to the first user content and the one or more standards applicable to the second user content. In some examples, the user interface 340 may include one or more standards applicable to additional pieces of user content that are also part of the collection. For example, UI generation 115 may obtain information about standards applicable to other pieces of user content in the collection by accessing user data 102, searching for the pieces of content in the collection, and obtaining applicable standards for those pieces of content.

CONCLUSION

Using the methods and techniques described above, the content classification system 110 may accurately and efficiently identify educational standards applicable to user content, such as knowledge assessment items and/or instructional content. Using the content classification system 110, users may be able to more effectively utilize additional educational content. For example, a user may create a collection of instructional content for a course that adequately covers all educational standards covered in the course. Further, tests and other assessments may be created that adequately cover all educational standards intended to be tested by the assessment. The content classification system 110 may further allow educators and other users to take advantage of larger banks of content, which may not be categorized according to different sets of educational standards, but may be categorized using the content classification system 110. The utilization of additional instructional and knowledge assessment content may be especially useful for online learning, creating differentiated student assessments.

The technology described herein may be implemented as logical operations and/or modules in one or more systems. The logical operations may be implemented as a sequence of processor-implemented steps directed by software programs executing in one or more computer systems and as interconnected machine or circuit modules within one or more computer systems, or as a combination of both. Likewise, the descriptions of various component modules may be provided in terms of operations executed or effected by the modules. The resulting implementation is a matter of choice, dependent on the performance requirements of the underlying system implementing the described technology. Accordingly, the logical operations making up the embodiments of the technology described herein are referred to variously as operations, steps, objects, or modules. Furthermore, it should be understood that logical operations may be performed in any order, unless explicitly claimed otherwise or a specific order is inherently necessitated by the claim language.

In some implementations, articles of manufacture are provided as computer program products that cause the instantiation of operations on a computer system to implement the procedural operations. One implementation of a computer program product provides a non-transitory computer program storage medium readable by a computer system and encoding a computer program. It should further be understood that the described technology may be employed in special purpose devices independent of a personal computer.

The above specification, examples and data provide a complete description of the structure and use of exemplary embodiments of the invention as defined in the claims. Although various embodiments of the claimed invention have been described above with a certain degree of particularity, or with reference to one or more individual embodiments, it is appreciated that numerous alterations to the disclosed embodiments without departing from the spirit or scope of the claimed invention may be possible. Other embodiments are therefore contemplated. It is intended that all matter contained in the above description and shown in the accompanying drawings shall be interpreted as illustrative only of particular embodiments and not limiting. Changes in detail or structure may be made without departing from the basic elements of the invention as defined in the following claims.

The invention claimed is:

1. A method of classifying user content based on a hierarchical set of educational standards, the method comprising:

receiving the user content via a user interface operating on a computer system having one or more processors and memory, wherein the computer system is configured for:

generating numeric representations of the user content, wherein the numeric representations of the user content comprise multidimensional feature vectors representing the user content;

identifying one or more standards of the hierarchical set of educational standards for applying to the user content;

generating numeric representations of the one or more identified standards, wherein the numeric representations of the one or more identified standards comprise multidimensional feature vectors representing the one or more identified standards; and classifying the user content based on a comparison of the numeric representations of the user content and the numeric representations of the one or more identified standards, wherein the comparison comprises a similarity function reflecting similarity or dissimilarity and semantic dependence or independence of the user content and the one or more identified standards; and outputting a metric based on the similarity function via the user interface, wherein the metric quantifies a match between the user content and one or more of the identified standards based on a distance determined between the multidimensional feature vectors representing the user content and the one or more identified standards;

wherein the computer system is further configured for executing:

an insights and visualization sub-module configured for creating and communicating display results for display via the user interface, wherein the display results include a histogram view and/or density plot, automatic taxonomic gap detection, and/or automatic data-analytic insights based on such display results; and a user feedback module configured to receive user validation and/or feedback via the user interface, and to determine based on said validation and/or feedback to validate the match as appropriate or inappropriate.

2. The method of claim 1, wherein generating the numeric representations of the user content comprises using a transformer model to generate the multidimensional feature vectors representing the user content and the one or more identified standards.

3. The method of claim 1, further comprising pre-processing the user content to create query tokens and converting the query tokens into the multidimensional feature vector representing the user content.

4. The method of claim 1, further comprising outputting the one or more identified standards via the user interface, wherein the standards are further identified based on the distance determined between the multidimensional feature vectors representing the user content and the respective standard, wherein one of the standards is identified as a primary standard that is closest to the user content based on the respective distance.

5. The method of claim 3, further comprising:

processing the multidimensional feature vector representing the user content to create a conditioned probability token for each query token, wherein the conditioned probability tokens are conditioned on the user content;

comparing the conditioned probability tokens to unconditioned probability tokens, wherein the unconditioned probability tokens are not conditioned on the user content; and aggregating a result of said comparing into the metric.

6. The method of claim 5, wherein the user content comprises an input string including text, wherein the unconditioned probability tokens are generated by processing the input string, and wherein the conditioned probability tokens are conditioned on the text.

7. A method of classifying user content based on a hierarchical taxonomic content map enumerating units of taxonomic content for a subject matter area, the method comprising:

receiving the user content via a user interface operating on a computer system having one or more processors and memory, wherein the computer system is configured for:

identifying one or more units of the user content;

generating numeric representations comprising multidimensional feature vectors representing the one or more units of the user content;

identifying one or more of the units of the taxonomic content in the taxonomic content map;

generating numeric representations comprising multidimensional feature vectors representing the one or more units of taxonomic content identified in the taxonomic content map; and identifying for the one or more units of the user content a similarity or semantic match relationship with the one or more units of taxonomic content identified in the taxonomic content map based on a comparison of the numeric representations of the one or more units of the user content and the numeric representations of the one or more units of taxonomic content identified in the taxonomic content map, wherein the comparison comprises a similarity function reflecting similarity or dissimilarity and semantic dependence or independence of the user content and the one or more identified units of taxonomic content;

displaying via the user interface at least a portion of the taxonomic content map enumerating one or more of the identified units of taxonomic content; and for each of said one or more identified units of taxonomic content, displaying via the user interface a metric based on the similarity function, wherein the metric quantifies the similarity or semantic match relationship based on a distance determined between the multidimensional feature vectors representing the one or more units of the user content and the one or more identified units of taxonomic content;

wherein the computer system is further configured for executing:

an insights and visualization sub-module configured for creating and communicating display results for display via the user interface, wherein the display results include a histogram view and/or density plot, automatic taxonomic gap detection, and/or automatic data-analytic insights based such display results; and a user feedback module configured to receive user validation and/or feedback via the user interface, and to determine based on said validation and/or feedback to validate the similarity or semantic match relationship as appropriate or inappropriate.

8. The method of claim 7, wherein the comparison of the numeric representations of the one or more units of the user content and the numeric representations of the one or more units of taxonomic content identified in the taxonomic content map comprises a set of similarity functions, and further comprising aggregating the similarity functions to generate the metric.

9. The method of claim 7, wherein generating numeric representations of the one or more units of the user content comprises using a transformer model to generate the multidimensional feature vectors representing the one or more units of the user content.

10. The method of claim 7, wherein the one or more identified units of the taxonomic content are comprised within a hierarchical set of educational standards for the subject matter area and the one or more units of the user content comprise at least one unit of learning content or assessment content for the hierarchical set of educational standards.

11. The method of claim 7, wherein identifying the similarity or semantic match relationship comprises computing the metric in an n-dimensional space based on the distance between the multidimensional feature vectors representing the one or more units of the user content and the one or more identified units of the taxonomic content.

12. The method of claim 7, wherein the metric comprises a confidence measure representing an extent to which the user content is semantically associated or disassociated with the taxonomic content.

13. The method of claim 7, further comprising preprocessing the units of user content to create query tokens and converting the query tokens into the multidimensional feature vectors representing the units of the user content.

14. The method of claim 13, further comprising: processing the multidimensional feature vectors representing the units of the user content to create conditioned probability tokens for each query token, wherein the conditioned probability tokens are conditioned on the user content;

comparing the conditioned probability tokens to unconditioned probability tokens, wherein the unconditioned probability tokens are not conditioned on the user content; and aggregating a result of said comparing into the metric.

15. The method of claim 14, wherein the user content comprises an input string including text, wherein the unconditioned probability tokens are generated by processing the input string, and wherein the conditioned probability tokens are conditioned on the text.

16. A method for classifying user content based on a hierarchical set of educational standards represented by a hierarchical map enumerating units of taxonomic content, the method comprising:

receiving a piece of the user content via a user interface operating on a computer system having one or more processors and memory, wherein the computer system is configured for:

identifying a standard of the set of educational standards for applying to the piece of the user content;

generating a numeric representation comprising a multidimensional feature vector representing the piece of user content;

generating a numeric representations comprising multidimensional feature vectors representing the units of taxonomic content enumerated in the hierarchical map representing the identified standard;

comparing the numeric representation of the piece of user content and the numeric representation of the identified standard via a similarity function reflecting similarity or dissimilarity and semantic dependence or independence of the piece of user content and the identified standard;

providing the piece of the user content and the identified standard to a generative model;

receiving output from the generative model; and determining if the identified standard applies to the piece of the user content based on the similarity function and the output received from the generative model, wherein the output comprises a confidence measure representing an extent to which the piece of user content is semantically associated or disassociated with one or more of the respective units of taxonomic content enumerated in the hierarchical map representing the identified standard; and further comprising:

displaying, via the user interface, at least a portion of the hierarchical map enumerating the one or more respective units of taxonomic content; and for each of said one or more respective units of taxonomic content, displaying, via the user interface, the confidence measure and a metric representing the similarity function, wherein the metric quantifies a match between the piece of content and the identified standard based on a distance determined between the multidimensional feature vectors representing the piece of user content and the one or more respective units of taxonomic content; wherein the computer system is further configured for executing:

an insights and visualization sub-module configured for creating and communicating display results for display via the user interface, wherein the display results include a histogram view and/or density plot, automatic taxonomic gap detection, and/or automatic data-ana-lytic insights based on such display results; and a user feedback module configured to receive user vali-dation and/or feedback via the user interface, and to determine based on said validation and/or feedback to validate the similarity or semantic match relationship as appropriate or inappropriate.

17. The method of claim 16, further comprising prepro-cessing the piece of user content to create query tokens prior to providing the piece of the user content to the generative model.

18. The method of claim 16, further comprising output-ting the identified standard via the user interface, wherein the standard is further identified as a primary standard that is closest to the user content based on the distance.

19. The method of claim 17, wherein providing the piece of the user content to the generative model comprises prompting the generative model to process the query tokens to generate the multidimensional feature vector representing the piece of user content, wherein the output indicates whether the identified standard applies to the piece of the user content based on said multidimensional feature vector.

20. The method of claim 19, wherein determining if the standard applies to the piece of the user content is further based on a similarity measure between the standard and the piece of the user content, wherein the similarity measure quantifies the distance between the multidimensional feature vectors representing the piece of user content and the identified standard, and wherein the distance is generated by a second generative model.

* * * * *